United States Patent
Kim et al.

(10) Patent No.: US 9,481,340 B2
(45) Date of Patent: Nov. 1, 2016

(54) RUPTURABLE TYPE HOOD HINGE DEVICE

(71) Applicants: Hyundai Motor Company, Seoul (KR); Kia Motors Corporation, Seoul (KR)

(72) Inventors: Sang Il Kim, Seoul (KR); Seong Tae Hong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/938,695

(22) Filed: Nov. 11, 2015

(65) Prior Publication Data

US 2016/0144822 A1 May 26, 2016

(30) Foreign Application Priority Data

Nov. 26, 2014 (KR) .................. 10-2014-0166136

(51) Int. Cl.
*B60R 21/34* (2011.01)
*E05D 3/14* (2006.01)
*E05D 11/00* (2006.01)

(52) U.S. Cl.
CPC .............. *B60R 21/34* (2013.01); *E05D 3/145* (2013.01); *E05D 2011/009* (2013.01); *E05Y 2900/536* (2013.01); *Y10T 16/521* (2015.01)

(58) Field of Classification Search
CPC . Y10T 16/521; Y10T 16/61; Y10T 16/5474; Y10T 16/535; B60R 21/34; B62D 25/12; E05D 3/145; E05D 11/00; E05D 7/10; E05D 2011/009; E05Y 2900/536; E05F 5/06
USPC ................ 16/222, 82, 368, 254; 296/193.11, 296/187.04; 180/69.2, 69.21, 274
See application file for complete search history.

(56) References Cited

U.S. PATENT DOCUMENTS

| 6,439,330 | B1* | 8/2002 | Paye | B60R 21/38 180/274 |
| 6,942,056 | B2* | 9/2005 | Nadeau | B60R 21/38 180/274 |
| 7,537,073 | B2 | 5/2009 | Kalliske et al. | |
| 7,597,166 | B2* | 10/2009 | Parks | B60R 21/38 180/274 |
| 7,896,122 | B2* | 3/2011 | Borg | B62D 25/12 180/274 |
| 8,768,574 | B1* | 7/2014 | Shaw | B60R 21/38 180/274 |
| 2002/0170759 | A1* | 11/2002 | Son | B62D 25/12 180/69.21 |

(Continued)

FOREIGN PATENT DOCUMENTS

| JP | 2002-002545 A | 1/2002 |
| JP | 2002-037018 A | 2/2002 |

(Continued)

*Primary Examiner* — William Miller
(74) *Attorney, Agent, or Firm* — McDermott Will & Emery LLP

(57) ABSTRACT

A rupturable type hood hinge device is provided on a vehicle body for opening or closing an engine room and reduces injury to a walker by reducing impact caused from collision with a hood. The hinge device includes a hinge bracket disposed on the engine room and fixed to the vehicle body and a hinge arm fixed to the hood to be rotatable with respect to the hinge bracket. A lowering lever link-connects one side of the hinge arm and one side of the hinge bracket. A rupturable bolt hinge-connects a connection portion of the lowering lever and the hinge bracket and is configured to sense the impact caused when the walker collides with the hood and at the same time to rupture such that the hood and the hinge arm fall and thereby the impact of the walker is dampened.

4 Claims, 5 Drawing Sheets

(56) References Cited

U.S. PATENT DOCUMENTS

| | | | |
|---|---|---|---|
| 2005/0285431 A1* | 12/2005 | Rex | B60R 21/38 296/187.04 |
| 2006/0108169 A1* | 5/2006 | Borg | B60R 21/38 180/274 |
| 2006/0131086 A1* | 6/2006 | Lutter | B60R 21/34 180/69.21 |
| 2007/0062748 A1 | 3/2007 | Erwin | |
| 2007/0102219 A1* | 5/2007 | Park | B60R 21/38 180/274 |
| 2008/0189015 A1 | 8/2008 | Borg et al. | |
| 2008/0302591 A1* | 12/2008 | Herzog | B60R 21/38 180/274 |
| 2009/0229485 A1* | 9/2009 | Parks | B60R 21/34 102/530 |
| 2009/0302644 A1* | 12/2009 | Mori | B60R 21/38 296/193.11 |

FOREIGN PATENT DOCUMENTS

| | | |
|---|---|---|
| JP | 2002-037127 A | 2/2002 |
| JP | 2002-544061 | 12/2002 |
| KR | 10-2003-0075284 A | 9/2003 |
| KR | 10-0756963 B1 | 9/2007 |
| KR | 10-2010-0008554 A | 1/2010 |
| KR | 10-1241017 B1 | 3/2013 |

* cited by examiner

- CLOSED -

- OPENED -

RUPTURABLE TYPE HOOD HINGE DEVICE

CROSS-REFERENCE TO RELATED APPLICATION

This application claims under 35 U.S.C. §119(a) the benefit of priority to Korean Patent Application No. 10-2014-0166136 filed on Nov. 26, 2014 the entire contents of which are incorporated herein by reference.

TECHNICAL FIELD

The present disclosure relates to a rupturable type hood hinge device a size and a weight of which can be reduced significantly while ensuring mass production of the conventional active and passive hood systems.

BACKGROUND

Generally, an engine room is provided on a front part of a vehicle and a hood is provided openable in the engine room. The hood serves to open or close the engine room and block engine noise by shielding the engine room wherein both left and right sides of a rear part of the hood are connected to a top of the engine room through a hood hinge assembly and the hood is rotated around the hood hinge assembly to open or close the engine room.

A hood is connected firmly and thus when a walker collides with a front part of a vehicle, a large injury is made to the walker as a part of a body such as head of the walker collides with the hood. Accordingly, recently an active hood system is applied thereto, which can ensure a space between the hood and the engine room for absorbing impact energy of the walker when collision occurs.

The active hood system is a safety device for protecting a walker, which can dampen the impact applied to the walker from a rear part of a hood (or hood hinge assembly) and at the same time reduce injury degree when collision occurs wherein when a sensor on a front bumper detects a walker collision if a walker collides with the front bumper, a controller operates an actuator according to a detection signal from the sensor to raise a rear part of the hood, thereby ensuring a dampening space between the hood and the engine room.

However, when the active hood system is malfunctioned due to a failure of a collision detection sensor, the impact applied to a walker cannot be absorbed through the active hood system when a walker collision occurs and the injury to the walker is aggravated.

In order to solve the drawbacks in the forgoing a technology of Korean Patent No. 10-1241017, entitled "Hood Hinge Device For Reducing Walker Injury", has been proposed. According to the conventional art, the hood hinge device includes: a hinge arm that is supported rotatably on a rear part of a hood; a hinge bracket that receives load of the hood through the hinge arm; a damping spring that supports elastically a lower part of the hinge bracket; a wedge bracket that is fixed a vehicle body; and a hinge wedge that connects or disconnects the hinge bracket to or from the wedge bracket depending on whether the hood is opened or closed wherein in a closed state of the hood the hinge bracket is separated from the wedge bracket to absorb impact load through the damping spring when a walker collies, and in an opened state of the hood the hinge bracket is connected to the wedge bracket to support the load of the hood that is transmitted through the hinge bracket so that the injury to a walker can be reduced through a damping structure embedded in a lower part of the hood hinge section and further the collected load of the hood is supported by the hinge wedge when the hood is opened, thereby reducing the injury to the walker who can secure basic performance of the hood at an ordinary day.

Accordingly, in order to meet to a walker protection regulation that is recently reinforced and respond to commerciality of a vehicle an active hood system that serves to reduce the injury to a head form by popping-up the hood is opened and mass-produced as a walker protection technology, however, cost and weight thereof are excessive so that other systems need to be developed. As a result, a passive hood technology has been developed, in which a hood is lowered to reduce the injury degree of a walker when the walker collides with a vehicle, however, there arise problems in that the injury to a walker is accelerated as the performance of a sensor for recognizing the impact applied to the walker is instable or malfunctioned and the size and weight thereof are excessive and thus it is difficult to ensure the space thereof and increase cost.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with prior art.

In one aspect, certain embodiments of the present invention provide a rupturable type hood hinge device, in which a collision may be recognized accurately through a load sensor and a rigidity of unlock is ensured through a rupturable bolt so as to overcome the drawbacks of a related art, ensure mass-production of a passive hood system, and reduce significantly a size and weight thereof.

In an embodiment, the present invention provides a rupturable type hood hinge device provided on a vehicle body for opening or closing an engine room and reduces injury to a walker by reducing an impact caused by collision with a hood. The hinge device includes. a hinge bracket disposed on the engine room and fixed to the vehicle body. The hinge bracket has opposing first and second sides. A hinge arm is fixed to the hood to be rotatable with respect to the hinge bracket. A lowering lever link-connects one side of the hinge arm to the first side of the hinge bracket. A rupturable bolt hinge-connects a connection portion of the lowering lever and the hinge bracket and is configured to sense the impact caused when the walker collides with the hood and at the same time is ruptured such that the hood and the hinge arm are fell down thereby to dampen the impact of the walker.

In certain embodiments, the rupturable bolt includes a body section that is penetration-inserted so as to link-connect the hinge bracket and the lowering lever. A bolt section may extend from one end of the body section and may be fastened to the hinge bracket. A main charge may be provided inside the body section and may be configured to separate the body section and the bolt section with an explosion. An initiator may be provided on one side of the body section and may be configured to ignite the main charge when a vehicle collides with a walker. A connection gun powder may be provided inside the body section and may transfer the fire of the initiator to the main charge.

In certain embodiments, the rupturable type hood hinge device further includes a load sensor provided on one side of the body section of the rupturable bolt. The load sensor may be configured to sense a collision impact force when a vehicle collides with a walker and transmit a rupture signal to the initiator.

In certain embodiments, the rupturable type hood hinge device further includes a damping lever link-connected between the hinge arm and the hinge bracket and provided with an impact damping section configured to dampen with elastic force an impact force due to falling of the lowering lever due to the rupture of the rupturable bolt. The hinge bracket may have opposing first and second main surfaces. The lowering lever may be disposed on the first main surface of the hinge bracket, and the damping lever may be disposed on the second main surface of the hinge bracket.

In certain embodiments, the impact damping section may include a spring provided on one of the opposing first and second sides of the hinge bracket. An extension section may be formed on the spring. A damping connect pin that may protrude from the damping lever and may be configured to push down the extension section and dampen the impact force due to the falling of the lowering lever.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
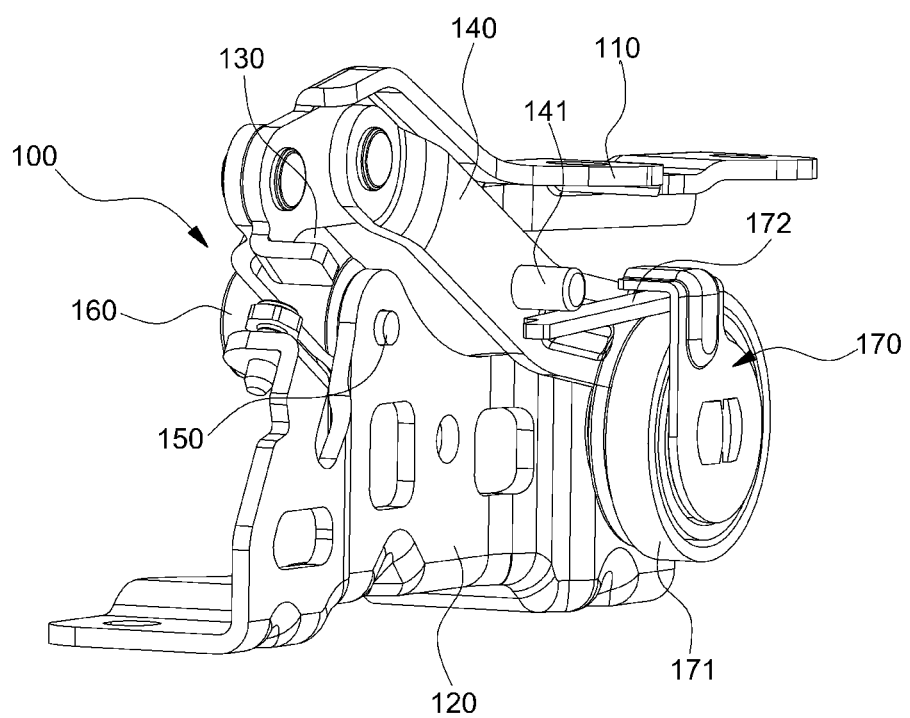
FIG. 1 is a schematic view showing a rupturable type hood hinge device according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2A:
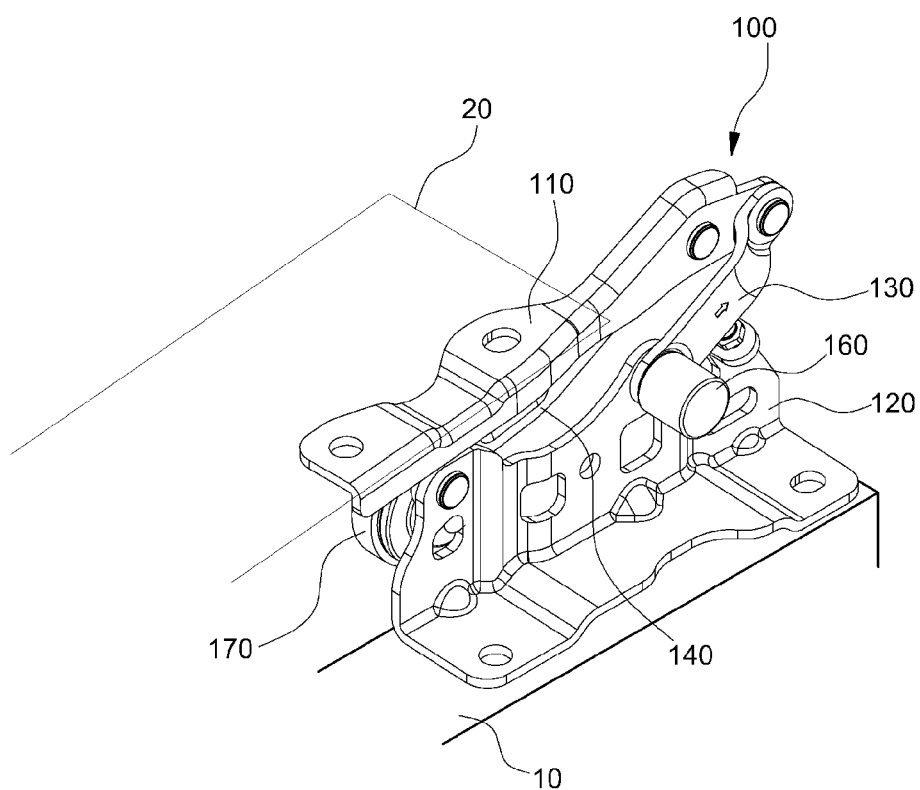
FIGS. 2A and 2B are schematic views showing a regular operation state of a rupturable type hood hinge device according to an embodiment of the present invention.
Figure 2B:
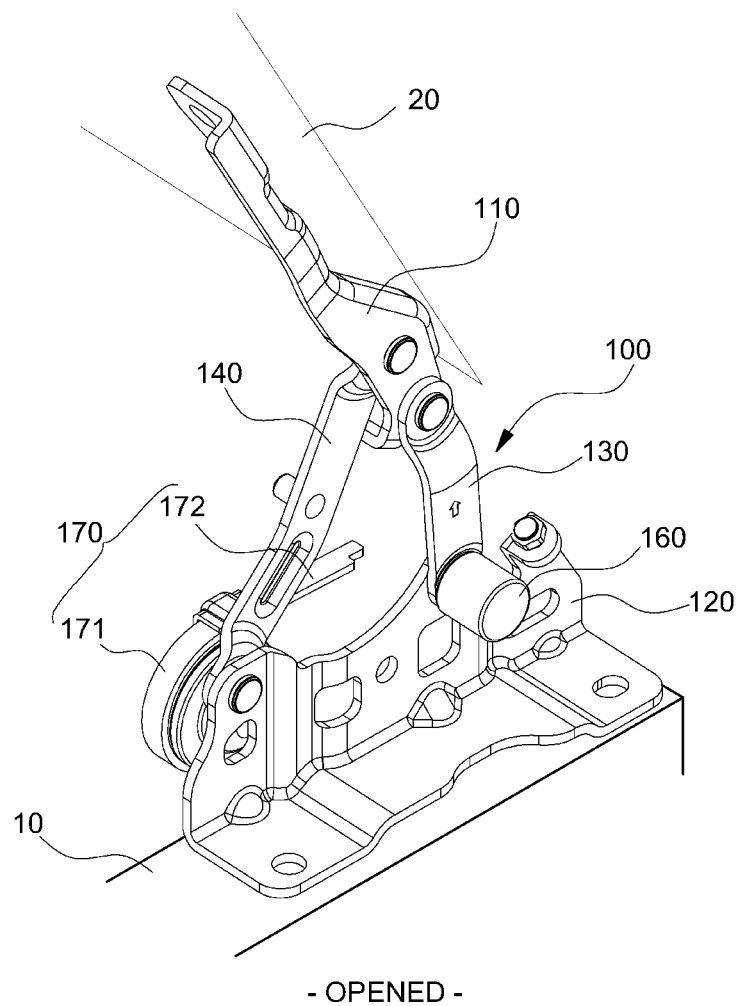

An embodiment of the present invention provides a rupturable type hood hinge device 100 (hereinafter, referred to as "hinge device") is arranged on a vehicle body 10 to open or close an engine room of a vehicle such that the impact collided with a hood 20 is reduced when a vehicle collides with a walker, thereby reducing the injury to the walker, as shown in FIGS. 1 and 2.

Firstly, a hinge bracket 120 is fixed to a part of a vehicle body 10 on which an engine room is displaced.

Further, a hinge arm 110 that is hinge-connected to the hinge bracket 120 is fixed to the hood 20 such that the hood opens or closes an engine room. In certain embodiments, the hinge arm 110 that is hinge-connected to the hinge bracket 120 is fixed to a rear end of the hood 20.

At this time, a lowering lever 130 is link-connected to one side of the hinge arm 110.

Here, an end of the lowering lever 130 at the other side is hinge-connected to a part of the hinge bracket 120 and a rupturable bolt 150 is fastened to the lowering lever 130, which may be ruptured due to the impact caused from a walker collision to disconnect the hinge-connection between the lowering lever 130 and the hinge bracket 120.

Further, in certain embodiments, a damping lever 140 is further provided on an opposite main surface of the hinge bracket 120 with respect to the lowering lever 130. The damping lever 140 is link-connected between the hinge arm 110 and the hinge bracket 120 and is provided with a impact damping section 170 for dampening with elastic force the lowering lever 130 that falls due to the disconnection at the rupturable bolt 150.

Here, in certain embodiments, when the hinge-connection of the lowering lever 130 is disconnected by the rupturable bolt 150 and at the same time load is applied from the lowering lever 130, the damping lever 140 reduces the impact force from the hinge arm 110 by elastic force of the impact damping section 170 provided on one side of the hinge bracket 120 thereby to reduce the degree of injury caused when a walker collides with the hood 20.

Additionally, in certain embodiments, the impact damping section 170 is provided on a side of the hinge bracket 120, and is provided with a spring 171 having an extension section 172 and a damping connect pin 141 that is formed on a part of the damping lever 140 to be protruded and reduces the impact force by pushing the extension section 172 through the lowering of the lowering lever 130.

Figure 4:
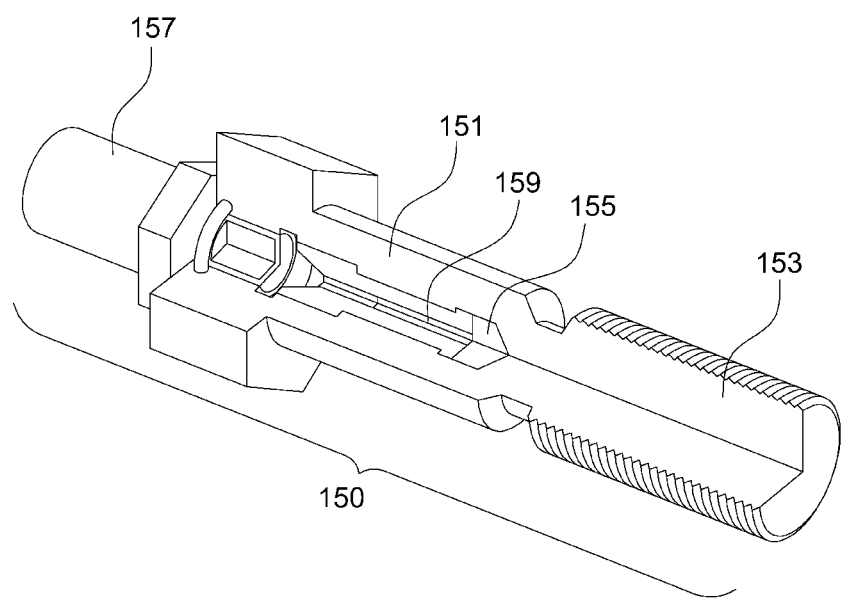
FIG. 4 is a schematic view showing a rupturable bolt of a rupturable type hood hinge device according to an embodiment of the present invention.

Meanwhile, in certain embodiments, as shown in FIG. 4, the rupturable bolt 150 is provided with a body section 151 which may be penetration-inserted for the link-connection of the hinge bracket 120 and the lowering lever 130 and a bolt section 153 that is extended from one end of the body section 151 and is fastened to the hinge bracket 120.

Further, in certain embodiments, inside the body section a main charge 155 for separating the body section 151 and the bolt section 153 with explosion, an initiator 157 that is provided on one side of the body section 151 and ignites the main charge 155 when a vehicle collides with a walker and a connection gun powder 159 that transfers the fire of the initiator 157 to the main charge 155 are provided in sequence.

In certain embodiments, a load sensor 160 is further provided on one side of the body section 151 of the rupturable bolt 150 for detecting a collision impact force when a vehicle collides with a walker and transfers a rupture signal to the initiator 157.

The operations of the rupturable type hood hinge device according to the present invention configured as described in the forgoing will be described referring to the drawings.

Firstly, the hinge device 100 of certain embodiments the present invention is arranged on a vehicle body 10 that, in certain embodiments, is disposed on a rear end of a hood 20 at a regular time, as shown in FIG. 2. In certain embodiments, the hinge arm 110 that is fixed to the hood 20 and the hinge bracket 120 that is fixed to the vehicle body 10 are link-connected each other by the lowering lever 130 such that when an engine room is opened by opening the hood 20, a hinge point is formed through the rotation of the hood 20.

Accordingly, FIG. 2(*a*) shows a closed state of the hood 20 in an engine room and FIG. 2(*b*) shows an operation state of the hinge device 100 when the hood 20 is opened from the engine room.

Figure 3:
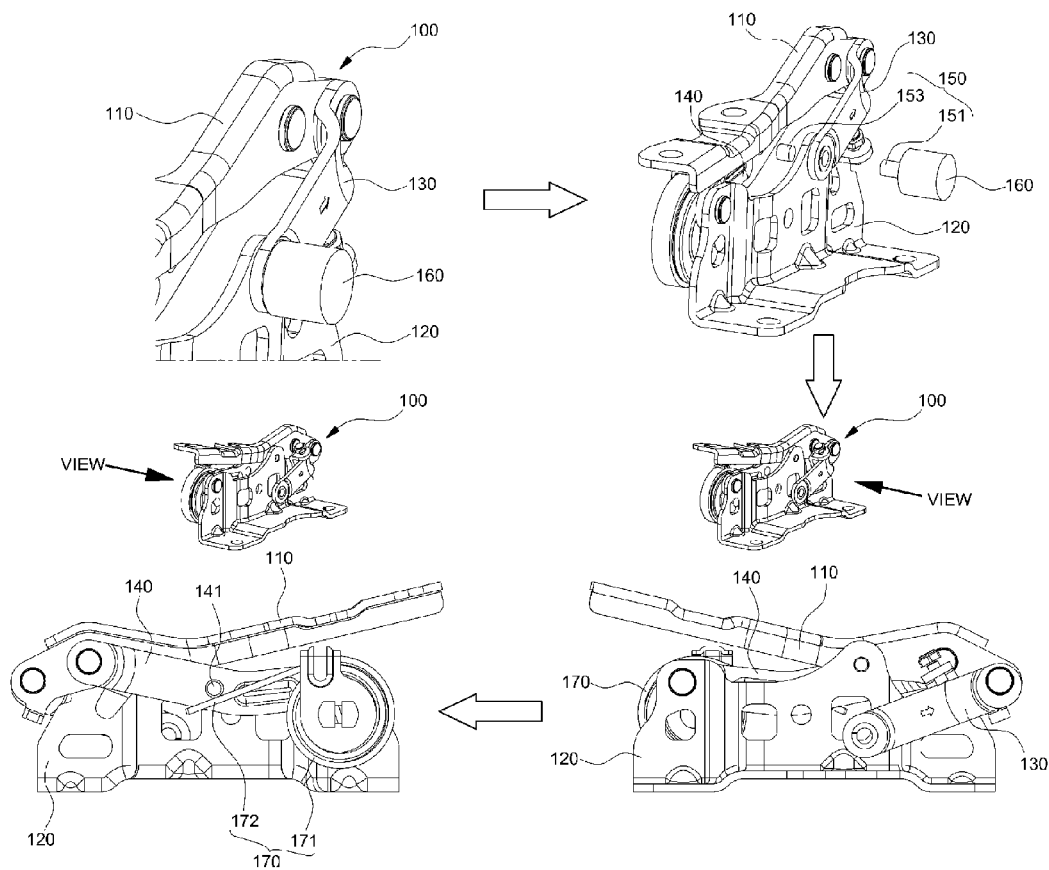
FIG. 3 is a schematic view showing a operation state of a rupturable type hood hinge device when a walker collides according to an embodiment of the present invention.

Meanwhile, referring to FIG. 3, in a case where a body or head of a walker collides with the hood 20 when a vehicle collides with the walker during a driving of the vehicle, the impact force is transferred to the hinge arm 110 and the lowering lever 130 that are connected, and the load sensor 160 provided on the rupturable bolt 150 detects the impact force and transmits signal to the initiator 157 such that the connection gun powder 159 and the main charge 155 are exploded to separate the body section 151 and the bolt section 153 of the rupturable bolt 150 thereby to release the role of a hinge for connecting the hinge bracket 120 and the lowering lever 130.

At this time, the hinge arm 110 and the lowering arm 130 that are connected are lowered, in certain embodiments, to 40 mm from their original locations along the hinge bracket 120 and the damping lever 140 that is link-connected to the hinge arm 110 is rotated downwardly along the hinge arm 110.

As a result, in certain embodiments, the damping connect pin 141 formed to be protruded on one side of the damping lever 140 compresses the extension section 172 of the spring 171 provided on the hinge bracket 120 thereby to dampen the impact force of the hood 20 through elastic force of the spring 171.

According to the hood hinge device, the size and weight thereof can be reduced significantly while ensuring mass-production comparing to a conventional active hood 20 system and a passive system.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A rupturable active hood hinge device provided on a vehicle body for opening or closing an engine room and reduces injury to a walker by reducing an impact caused by collision with a hood, the device comprising:
    a hinge bracket disposed on the engine room and fixed to the vehicle body, the hinge bracket having opposing first and second sides;
    a hinge arm fixed to the hood to be rotatable with respect to the hinge bracket;
    a lowering lever link-connecting one side of the hinge arm to the first side of the hinge bracket; and
    a rupturable bolt hinge-connecting a connection portion of the lowering lever and the hinge bracket and configured to sense the impact caused when the walker collides with the hood and at substantially the same time to rupture such that the hood and the hinge arm fall and thereby the impact of the walker is dampened,
    wherein the rupturable bolt comprises:
    a body section that is penetration-inserted so as to link-connect the hinge bracket and the lowering lever;
    a bolt section extending from one end of the body section and fastened to the hinge bracket;
    a main charge that is provided inside the body section and is configured to separate the body section and the bolt section with an explosion;
    an initiator that is provided on one side of the body section and is configured to ignite the main charge when a vehicle collides with a walker; and
    a connection gun powder that is provided inside the body section and is configured to transfer the fire of the initiator to the main charge.

2. The rupturable active hood hinge device of claim 1, further comprising a load sensor provided on one side of the body section of the rupturable bolt, the load sensor configured to sense a collision impact force when a vehicle collides with a walker and transmit a rupture signal to the initiator.

3. The rupturable active hood hinge device of claim 1, further comprising a damping lever link-connected between the hinge arm and the hinge bracket and provided with an impact damping section configured to dampen with elastic force an impact force due to falling of the lowering lever due to the rupture of the rupturable bolt, wherein
    the hinge bracket has opposing first and second main surfaces, the lowering lever is disposed on the first main surface of the hinge bracket, and the damping lever is disposed on the second main surface of the hinge bracket.

4. The rupturable active hood hinge device of claim 3, wherein the impact damping section comprises: a spring provided on one of the opposing first and second sides of the hinge bracket, the spring having an extension section formed thereon; and a damping connect pin that protrudes from the damping lever and is configured to push down the extension section and dampen the impact force due to the falling of the lowering lever.

* * * * *